(12) United States Patent
Kang et al.

(10) Patent No.: US 9,898,080 B2
(45) Date of Patent: Feb. 20, 2018

(54) METHOD AND APPARATUS FOR EYE TRACKING

(71) Applicant: Samsung Electronics Co., Ltd., Suwon-si, Gyeonggi-do (KR)

(72) Inventors: Byong Min Kang, Yongin-si (KR); Jingu Heo, Yongin-si (KR); Dong Kyung Nam, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 10 days.

(21) Appl. No.: 15/014,722

(22) Filed: Feb. 3, 2016

(65) Prior Publication Data
US 2017/0068315 A1 Mar. 9, 2017

(30) Foreign Application Priority Data
Sep. 7, 2015 (KR) .......................... 10-2015-0126149

(51) Int. Cl.
| | |
|---|---|
| *G06K 9/46* | (2006.01) |
| *G06F 3/01* | (2006.01) |
| *G06K 9/00* | (2006.01) |
| *H04N 13/04* | (2006.01) |
| *G06T 7/73* | (2017.01) |

(52) U.S. Cl.
CPC ........... *G06F 3/013* (2013.01); *G06K 9/0061* (2013.01); *G06K 9/00597* (2013.01); *G06K 9/00604* (2013.01); *G06T 7/73* (2017.01); *H04N 13/0484* (2013.01); *G06T 2207/10004* (2013.01); *G06T 2207/30201* (2013.01)

(58) Field of Classification Search
CPC ............. G06K 9/00604; G06K 9/0061; G06K 9/00597; G06F 3/013; G06T 2207/30201; G06T 2207/10004; G06T 7/0042; H04N 13/04
USPC .......................................... 382/117, 118, 203
See application file for complete search history.

(56) References Cited

U.S. PATENT DOCUMENTS

| | | | |
|---|---|---|---|
| 6,075,557 A | 6/2000 | Holliman et al. | |
| 7,538,744 B1 | 5/2009 | Liu et al. | |

(Continued)

FOREIGN PATENT DOCUMENTS

| | | |
|---|---|---|
| EP | 2597597 A2 | 5/2013 |
| JP | 4898026 B2 | 3/2012 |

(Continued)

OTHER PUBLICATIONS

Swirski, L. et al., "Robust real-time pupil tracking in highly off-axis images," Proceedings of the Symposium on Eye Tracking Research and Applications, Jan. 31, 2012.

(Continued)

*Primary Examiner* — Daniel Mariam
(74) *Attorney, Agent, or Firm* — Harness, Dickey & Pierce, P.L.C.

(57) ABSTRACT

A method and apparatus for eye tracking are disclosed. The method may include obtaining feature points corresponding to at least one portion of a face area of the user in an image, determining an inner area of an eye area of a first eye of the user based on the feature points, determining a pupil area of the user based on a pixel value of at least one pixel of the inner area, and determining an eye position of the user based on a position value of each pixel of the pupil area.

19 Claims, 13 Drawing Sheets

(56) References Cited

U.S. PATENT DOCUMENTS

| | | | |
|---|---|---|---|
| 8,457,352 B2 | 6/2013 | Hennessey et al. | |
| 8,750,623 B2* | 6/2014 | Ruan | G06T 7/12 |
| | | | 382/103 |
| 8,891,819 B2* | 11/2014 | Kaneda | A61B 3/113 |
| | | | 345/158 |
| 9,185,352 B1* | 11/2015 | Jacques | H04N 7/18 |
| 2009/0196460 A1 | 8/2009 | Jakobs et al. | |
| 2015/0097925 A1 | 4/2015 | Choo et al. | |
| 2015/0098633 A1* | 4/2015 | Kato | G06K 9/00288 |
| | | | 382/118 |
| 2015/0138066 A1 | 5/2015 | Seok et al. | |
| 2015/0161472 A1* | 6/2015 | Yoshioka | G06K 9/52 |
| | | | 382/197 |
| 2016/0105658 A1* | 4/2016 | Choo | H04N 13/0018 |
| | | | 348/40 |

FOREIGN PATENT DOCUMENTS

| | | | |
|---|---|---|---|
| KR | 20130068732 A | 6/2013 | |
| KR | 1286965 B1 | 7/2013 | |
| KR | 1471488 B1 | 12/2014 | |

OTHER PUBLICATIONS

Asteridais, S. et al., "An Eye Detection Algorithm Using Pixel to Edge Information," Proceedings of ISCCSP, Mar. 15, 2016.
Extended European Search Report dated Jan. 3, 2017.
Zhu, Z. et al., "Eye and gaze tracking for interactive graphic display," Machine Vision and Applications, pp. 139-148, 2004.

* cited by examiner

METHOD AND APPARATUS FOR EYE TRACKING

CROSS-REFERENCE TO RELATED APPLICATION

This application claims priority under 35 U.S.C. § 119 to Korean Patent Application No. 10-2015-0126149, filed on Sep. 7, 2015, at the Korean Intellectual Property Office, the entire contents of which are incorporated herein by reference in its entirety.

BACKGROUND

1. Field

At least one example embodiment relates to eye tracking technology.

2. Description of the Related Art

There is technology for tracking a position of a user in association with a glassless three-dimensional (3D) display that provides a 3D effect using a binocular disparity principle. The 3D display may be controlled based on the position of the user. Accurately tracking a position of a user is a part of outputting a 3D image without deterioration in image quality to a glassless 3D display.

SUMMARY

At least some example embodiments relate to an eye tracking method.

In at least some example embodiments, the method may include obtaining feature points corresponding to at least one portion of a face area of the user in an image, determining an inner area of an eye area of a first eye of the user based on the feature points, determining a pupil area of the user based on a pixel value of at least one pixel of the inner area, and determining an eye position of the user based on a position value of each pixel of the pupil area.

The determining of the inner area may include determining the inner area of the eye area based on positions of pixels of the eye area and positions of the feature points of the eye area, wherein the inner eye area is within a boundary defined by the feature points.

The determining of the pupil area may include determining the pixels of the pupil area based on a first brightness average value of the pixels of the inner area and a second of adjacent pixels to an eye center feature point of the image, the eye center feature point being a feature point corresponding to a center of the first eye of the user of the feature points.

The determining of the pixels of the pupil area of the image may include determining whether a brightness value of a selected pixel of the inner area is less than a first threshold value and less than a second threshold value, the first threshold value being based on the first brightness value and the second threshold value being based on the second brightness average value.

The determining of the inner area may include calculating a first vector based on selected pixel of the eye area and a first eye contour feature point of the feature points, calculating a second vector based on the first eye contour feature point and a second eye contour feature point of the feature points, the second eye contour feature point being adjacent to the first eye contour feature point, and determining whether the selected pixel is in the inner area based on the first vector and the second vector.

The determining whether the selected pixel is in the inner area may include determining that the selected pixel is in the inner area when vector calculation results of each of the first and second eye contour feature points are indicated by a same sign.

In at least another example embodiment, the method further includes controlling a glassless display based on the determined eye position of the user.

At least other example embodiments relate to an eye tracking apparatus.

In at least some example embodiments, the eye tracking apparatus may include a memory configured to store computer readable instructions and a processor configured to obtain feature points corresponding to at least one portion of a face area of the user in an image, determine an inner area of an eye area of a first eye of the user based on the feature point; determine a pupil area of the user based on a pixel value of at least one pixel of the inner area, and determine an eye position of the user based on a position value of each pixel of the pupil area.

The processor may be configured to determine the pixels of the inner area in response to a vector calculation result based on a positional relationship between the feature points and pixels of the eye area.

The processor may be configured to determine the pixels of the pupil area based on a brightness value of the pixels of the inner area, a first brightness average value of the pixels of the inner eye area of the image and a second brightness average value of adjacent pixels of an eye center feature point of the feature points, the eye center feature point corresponds to a center of an eye of the user.

At least other example embodiments relate to an eye tracking apparatus.

In at least some example embodiments, the eye tracking apparatus may include a memory configured to store computer readable instructions and a processor configured to determine an eye area of a user in an image based on feature points, detect an edge component in a vertical direction of the eye area and detect an ellipse component associated with a pupil area based on the detected edge component, and determine a center of an ellipse as an eye position of the user based on the ellipse component At least one example embodiment discloses an eye tracking method. The method includes determining an eye area of a first eye of a user in an image based on feature points of the eye area, determining an inner area of the eye area based on positions of pixels of the eye area and positions of the feature points of the eye area, determining a pupil area of the user based on a pixel value of each pixel of the inner area and determining an eye position of the user based on a position value of each pixel of the pupil area.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
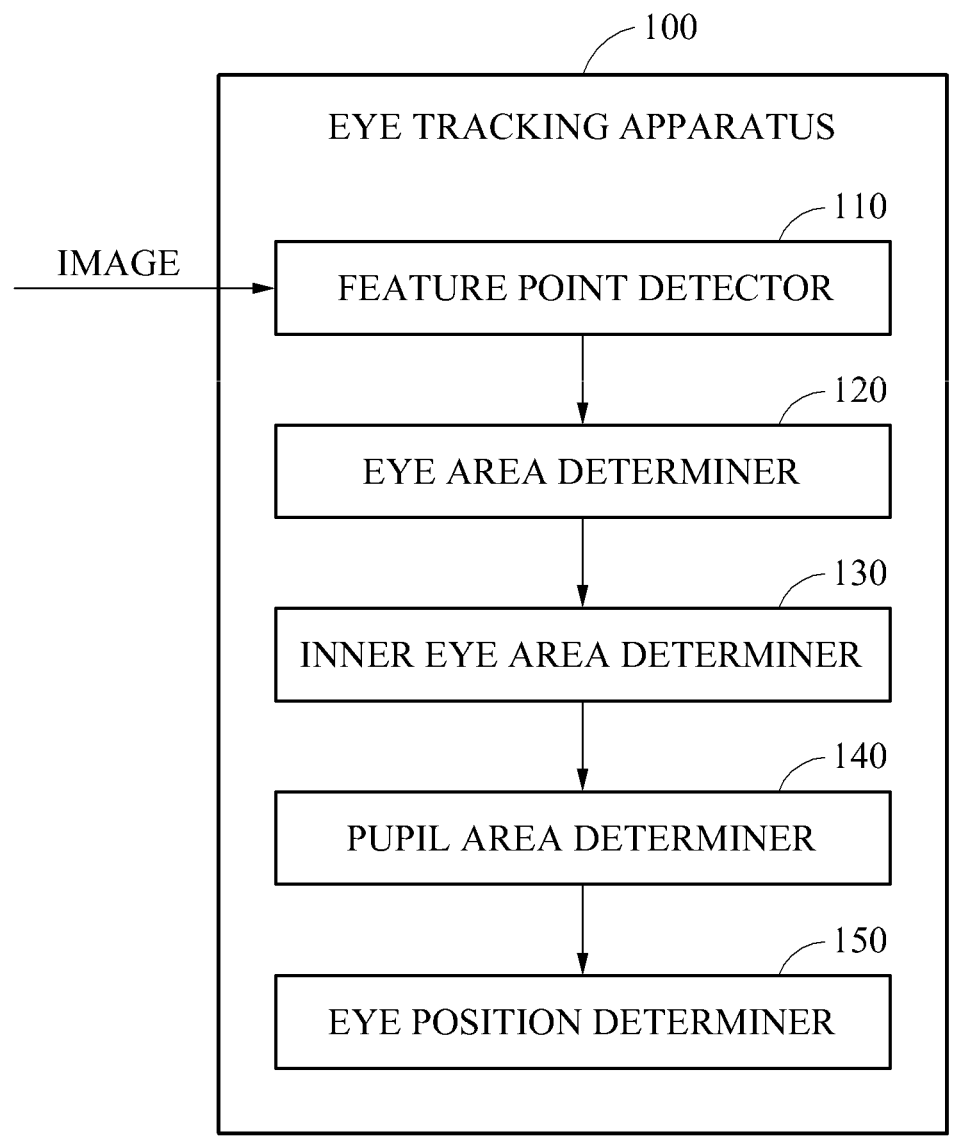
FIG. 1 illustrates an example of an eye tracking apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments may be applied for tracking an eye view of a user in various applications, for example, a glassless three-dimensional (3D) display, a glass-type wearable device, virtual reality (VR), a video game, a personal computer (PC), a tablet computer, a mobile device, a smart home appliance, and an intelligent car. For example, example embodiments may be applied to display a 3D image based on an eye position of a user by tracking the eye position of the user in a glassless 3D display.

Various example embodiments will now be described more fully with reference to the accompanying drawings in which some example embodiments are shown. In the drawings, the thicknesses of layers and regions are exaggerated for clarity.

FIG. 1 illustrates an example of an eye tracking apparatus according to at least one example embodiment.

Referring to FIG. 1, an eye tracking apparatus 100 determines an eye position of a user from an image in which an eye area of the user is photographed. The image may be obtained by an image obtaining apparatus (not shown), for example, a camera, and the obtained image may be transmitted to the eye tracking apparatus 100. The eye tracking apparatus 100 may determine an eye position of the user for each received image frame and output information on the determined eye position. The output information may be used for various applications based on information on an eye position of a user.

The eye tracking apparatus 100 includes a feature point detector 110, an eye area determiner 120, an inner eye area determiner 130, a pupil area determiner 140, and an eye position determiner 150. Operations of the feature point detector 110, the eye area determiner 120, the inner eye area determiner 130, the pupil area determiner 140, and the eye position determiner 150 may be performed by at least one processor executing computer-readable instructions stored in a memory or by a field programmable gate array (FPGA).

The feature point detector 110 detects feature points of an eye from an image. The feature point detector 110 may detect a face area or an eye and nose area of the user in the image, and detect at least one eye contour feature point and an eye center feature point in the detected face area or the eye and nose area. The eye center feature point refers to a feature point detected in a vicinity of a center of the eye area, and the eye contour feature point refers to a feature point detected on a contour of the eye.

The feature point detector 110 may extract a local feature, for example, a local binary pattern (LBP), a scale invariant feature transform (SIFT), a histogram of oriented gradient (HOG), a modified census transform (MCT), and a Gabor jet, of an image, and detect the eye and nose area from the image by inputting the detected feature to an eye and nose area recognizer (not shown) trained in advance. In an example, the feature point detector 110 may detect eye contour feature points in the eye and nose area using an active contour model (ACM), an active shape model (ASM), an active appearance model (AAM), or a supervised descent method (SDM), and determine a center point among the detected eye contour feature points as an eye center feature point.

The eye area determiner 120 determines the eye area of the user in the image based on the feature points detected by the feature point detector 110. The eye area determiner 120 may determine a maximum distance among distances between the eye center feature point and the eye contour feature points by calculating distances between the eye center feature point and each of the eye contour feature points, and determine the eye area based on the eye center feature point and the maximum distance. For example, the eye area determiner 120 may determine, as the eye area, an area located within the maximum distance based on the eye center feature point or an area horizontally and vertically located within the maximum distance based on the eye center feature point.

The inner eye area determiner 130 determines an inner eye area in the eye area. The inner eye area refers to an area corresponding to an actual eye of a user. The inner eye area determiner 130 may determine the inner eye area in response to a vector calculation result based on a position relationship between the eye contour feature points and pixels of the eye area. For example, the inner eye area determiner 130 may calculate a first vector based on a position of a current pixel of the eye area and a position of the eye contour feature point and calculate a second vector based on the position of the eye contour feature point and a position of an adjacent eye contour feature point. Another eye contour feature point positioned in a clockwise direction from the eye contour feature point may be determined as the adjacent eye contour feature point. The inner eye area determiner 130 may perform outer product calculation of a vector based on the first vector and the second vector.

The inner eye area determiner 130 may also calculate the first vector and the second vector and perform the outer product calculation with respect to other eye contour feature points. The inner eye area determiner 130 may determine that the current pixel is included in the inner eye area when outer product calculation results with respect to the current pixel and each of the eye contour feature points are indicated by a same sign. The inner eye area determiner 130 may determine that the current pixel is included in an outer eye area other than the inner eye area when the outer product calculation results are indicated by different signs.

The pupil area determiner 140 determines a pupil area based on a pixel value of pixels of the inner eye area. The pupil area determiner 140 may determine pixels of the pupil area based on a first brightness average value of pixels of the inner eye area and a second brightness average value of adjacent pixels of the eye center feature point. For example, the pupil area determiner 140 may determine that the current pixel is included in the pupil area when a brightness value of the current pixel of the inner eye area is less than a first threshold value based on the first brightness average value and a second threshold value based on the second brightness average value. In an example, the first threshold value may be equal to the first brightness average value, and the second threshold value may have a value greater than or equal to the second brightness average value.

The eye position determiner 150 determines an eye position of the user based on a position value (e.g., 2D coordinates) of each pixel of the pupil area. For example, the eye position determiner 150 determines an average value of position values of the pixels of the pupil area as the eye position of the user.

In another example, the feature point detector 110 may not fully detect the feature points with respect to the eye area in the image. Hereinafter, a process in which the eye tracking apparatus 100 determines the eye position of the user from the image when the feature point detector 110 detects a small number of the eye contour feature points from the image will be described.

The eye area determiner 120 determines the eye area of the user in the image based on the eye contour feature points detected in the image. For example, when the eye contour feature points positioned in an eye contour are detected, the eye area determiner 120 may calculate a center among the eye contour feature points and calculate a distance in a horizontal direction among the eye contour feature points based on the determined center. The eye area determiner 120 may determine a distance in a vertical direction by multiplying the distance in the horizontal direction by a predetermined and/or selected value and determine, as the eye area, an area based on the distance in the horizontal direction and the distance in the vertical direction according to the center among the eye contour feature points. The pupil area determiner 140 may detect an edge component in a vertical direction in the determined eye area and detect an ellipse component associated with the pupil area based on the detected edge component. Here, an ellipse of the ellipse component includes a circle. The eye position determiner 150 may estimate a virtual ellipse overlapping with the pupil area based on the detected ellipse component and determine a center of gravity of the ellipse as the eye position of the user.

The eye position determiner 150 converts eye position information of a two-dimensional (2D) coordinate value determined based on the aforementioned process to a 3D coordinate value. For example, the eye position determiner 150 may convert the eye position information to the 3D coordinate value based on distance information on a distance between both eyes and direction information on the face of the user. In this example, a standard value, for example, 65 millimeters (mm), may be used as the distance information on the distance between both eyes. However, the distance information on the distance between both eyes is not limited thereto. For example, the eye position determiner 150 may generate a personalized 3D face model by matching the feature points detected in the image and a 3D face model, and estimate the direction information on the face of the user based on direction information on the personalized face model.

Hereinafter, the eye tracking apparatus 100 which may accurately detect the eye position of the user in the image based on the aforementioned process, is described. The eye tracking apparatus 100 may reduce a vibration of the eye position generated between image frames by tracking centers of two pupil areas for each image frame.

FIGS. 2 through 8 illustrate examples in which an eye tracking apparatus tracks an eye position of a user in an image according to at least one example embodiment.

Figure 2:
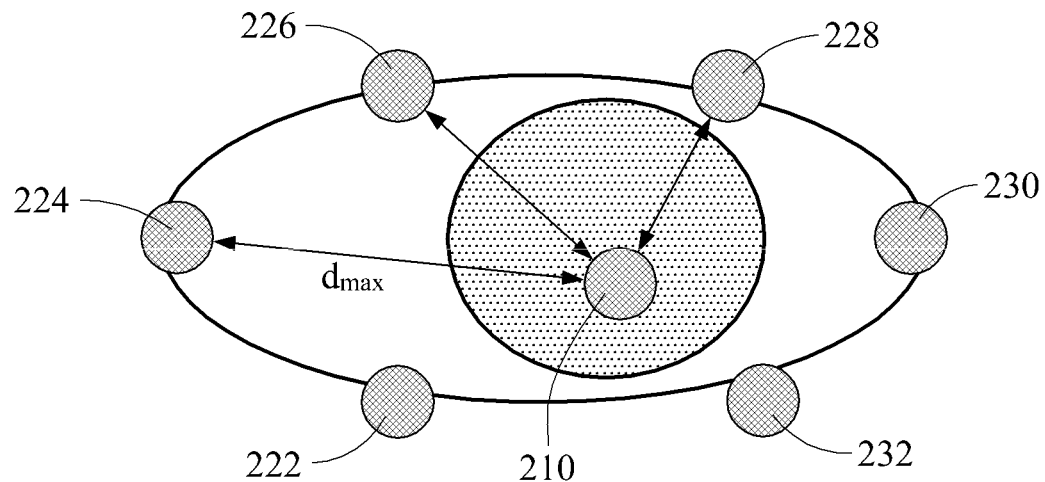
FIGS. 2 through 8 illustrate examples in which an eye tracking apparatus tracks an eye position of a user in an image according to at least one example embodiment.

Referring to FIG. 2, an eye tracking apparatus may detect an eye center feature point 210 estimated to be positioned in an eye center in an image and eye contour feature points 222, 224, 226, 228, 230, and 232 positioned in an eye contour. The eye tracking apparatus may calculate a distance between the eye center feature point 210 and each of the eye contour feature points 222, 224, 226, 228, 230, and 232 and determine a maximum distance value dmax based on values of each calculated distance (e.g., a maximum distance among the calculated distances).

Figure 3:
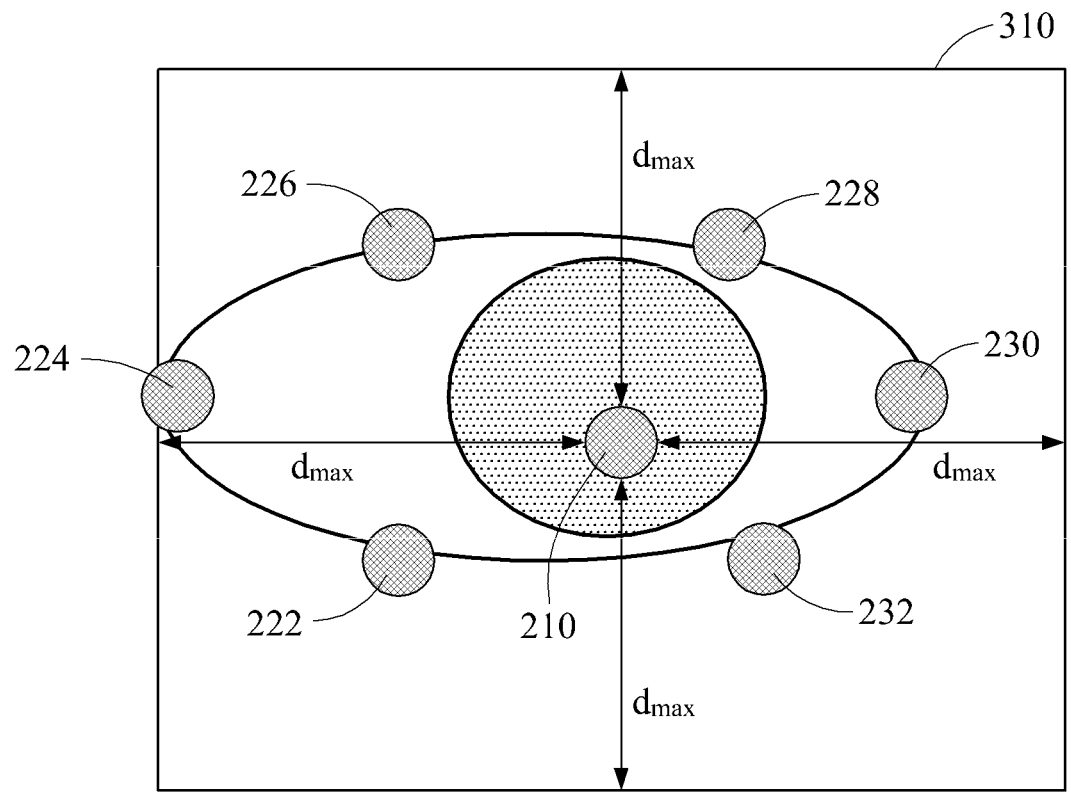

Referring to FIG. 3, the eye tracking apparatus may determine an eye area 310 based on the maximum distance value dmax determined in FIG. 2. The eye tracking apparatus may determine an area horizontally and vertically located within the maximum distance value dmax based on the eye center feature point 210. The eye area 310 may be a rectangular shape as illustrated in FIG. 4, or a circular shape of which a radius corresponds to the maximum distance value dmax based on the eye center feature point 210, however, the scope of example embodiments is not limited thereto.

Figure 4:
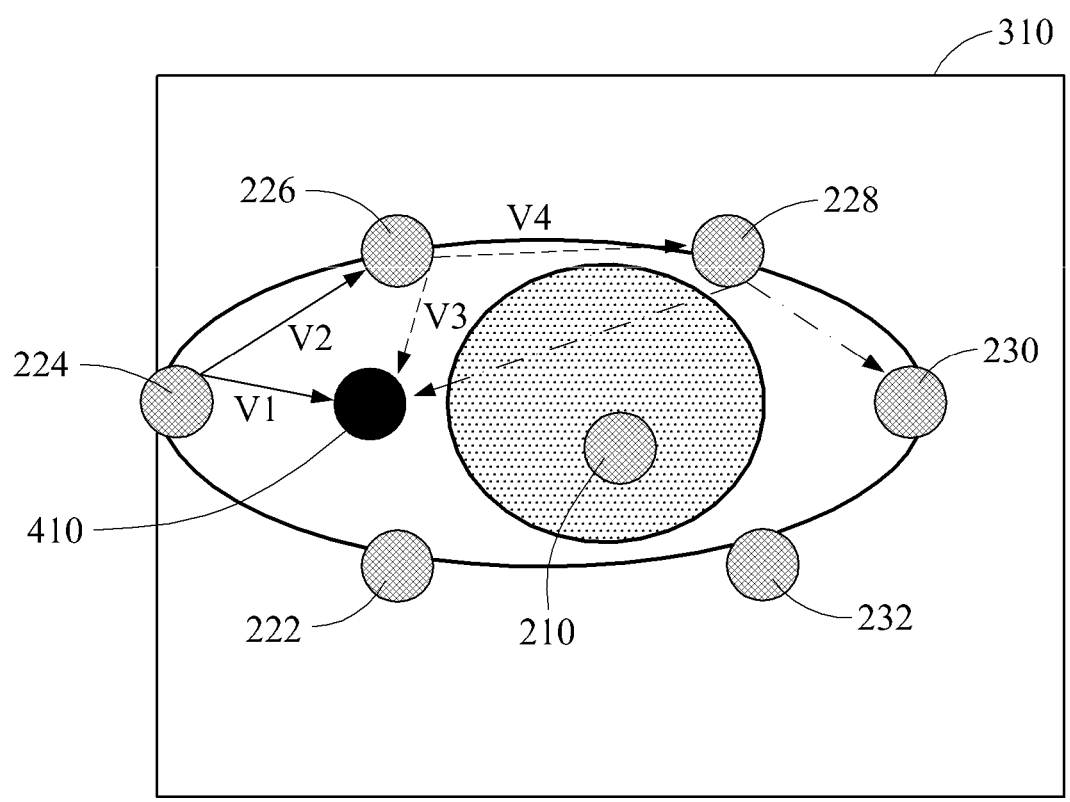

Referring to FIG. 4, the eye tracking apparatus may determine an inner eye area in the eye area 310. The eye tracking apparatus may determine whether a pixel 410 is included in the inner eye area based on a positional relationship between the pixel 410 of the eye area 310 and the eye contour feature points 222, 224, 226, 228, 230, and 232. The eye tracking apparatus may perform outer product calculation between a first vector V1 based on the eye contour feature point 224 and the pixel 410, and a second vector V2 based on the eye contour feature point 224 and the eye contour feature point 226 adjacent to the eye contour feature point 224 in a clockwise direction. In the same manner, the eye tracking apparatus may perform the outer product calculation between a first vector V3 based on the eye contour feature point 226 and the pixel 410 and a second vector V4 based on the eye contour feature point 226 and the eye contour feature point 228 adjacent to the eye contour feature point 226 in a clockwise direction. The eye tracking apparatus may perform the outer product calculation with respect to other eye contour feature points 222, 228, 230, and 232 based on the same process and may determine whether all outer product calculation results are indicated by a same sign. In a case of the pixel 410, outer product calculation results are indicated by a same sign, thereby determining that the pixel 410 is included in the inner eye area.

Figure 5:
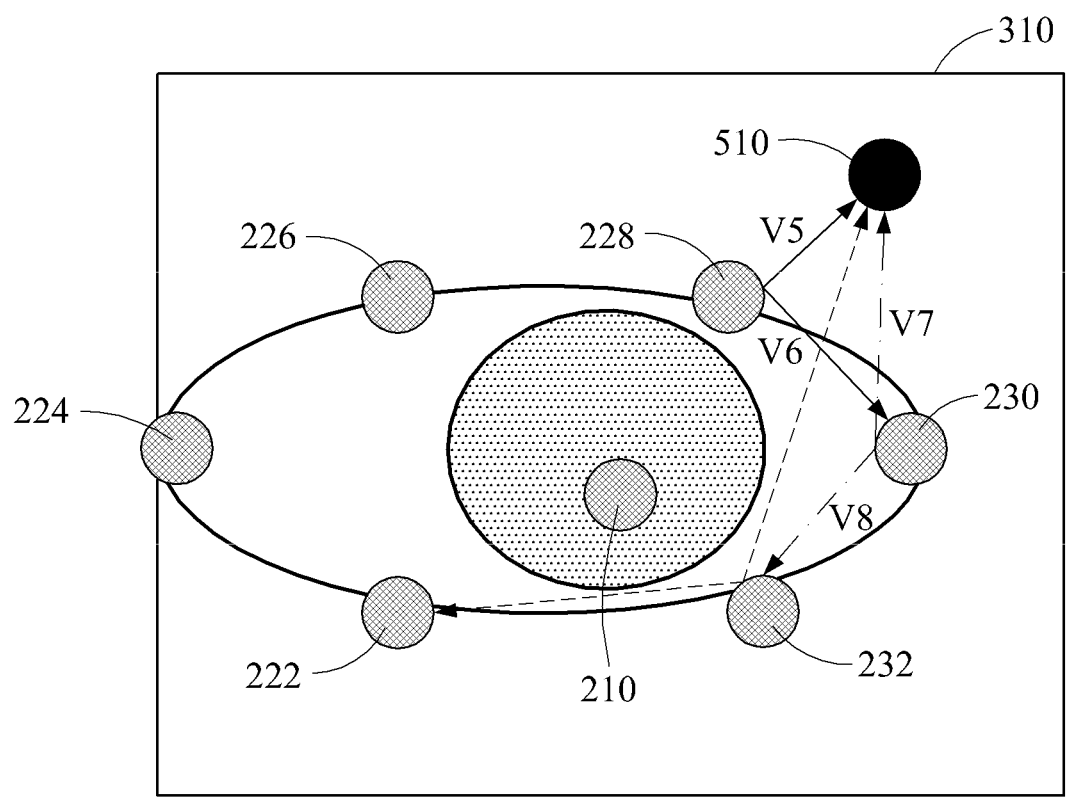

As illustrated in FIG. 5, when a process identical to the process of FIG. 4 is performed with respect to a pixel 510 that exists in the eye area 310 but is actually positioned in an external eye area, outer product calculation results between the pixel 510 and each of the eye contour feature points 222, 224, 226, 228, 230, and 232 are not indicated by a same sign. For example, when an outer product calculation result between a first vector V5 based on the eye contour feature point 228 and the pixel 510 and a second vector V6 based on the eye contour feature point 228 and the eye contour feature point 230 adjacent to the eye contour feature point 228 in a clockwise direction is indicated by a sign "+", an outer product calculation result between a first vector V7 based on the eye contour feature point 230 and the pixel 510 and a second vector V8 based on the eye contour feature point 230 and the eye contour feature point 232 adjacent to the eye contour feature point 230 in a clockwise direction is indicated by a sign "−". Since the signs of the outer product calculation results between the pixel 510 and each of the eye contour feature points 222, 224, 226, 228, 230, and 232 are not identical, the eye tracking apparatus may determine that the pixel 510 is not included in the inner eye area.

Figure 6:
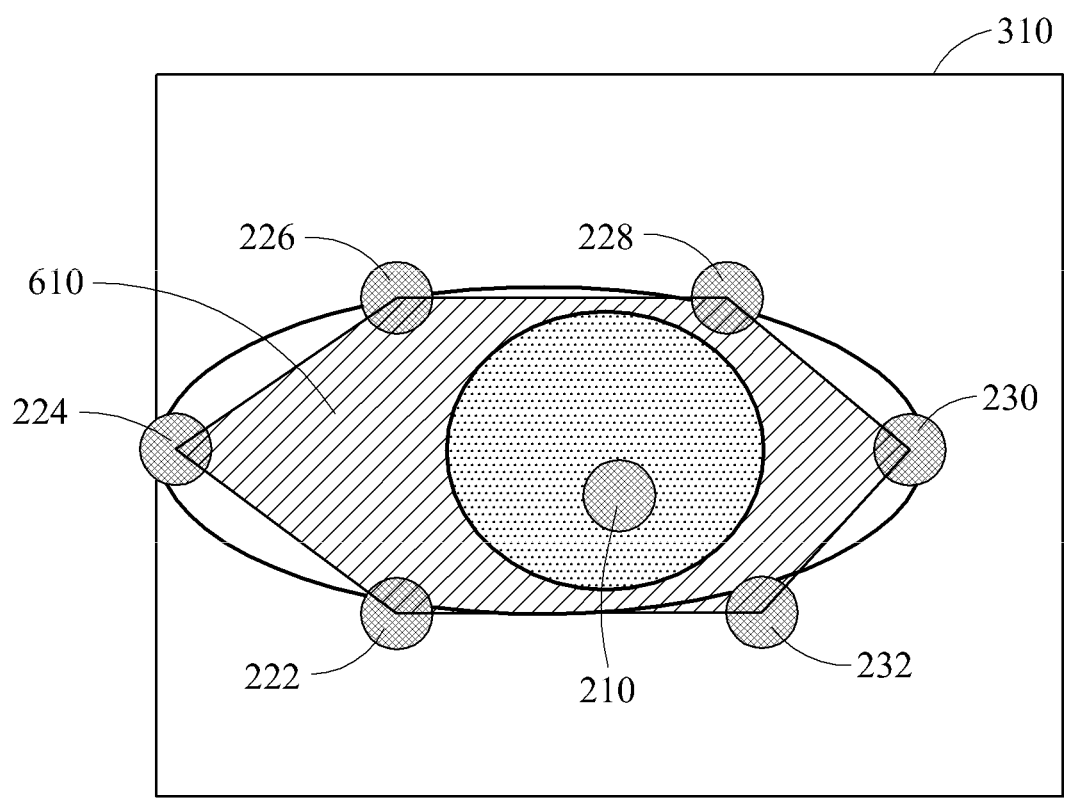

The eye tracking apparatus may determine pixels of the inner eye area in the eye area 310 by performing the process of FIGS. 4 and 5 with respect to each pixel included in the eye area 310. FIG. 6 illustrates an inner eye area 610 detected from the eye area 310 based on the process of FIGS. 4 and 5.

Figure 7:
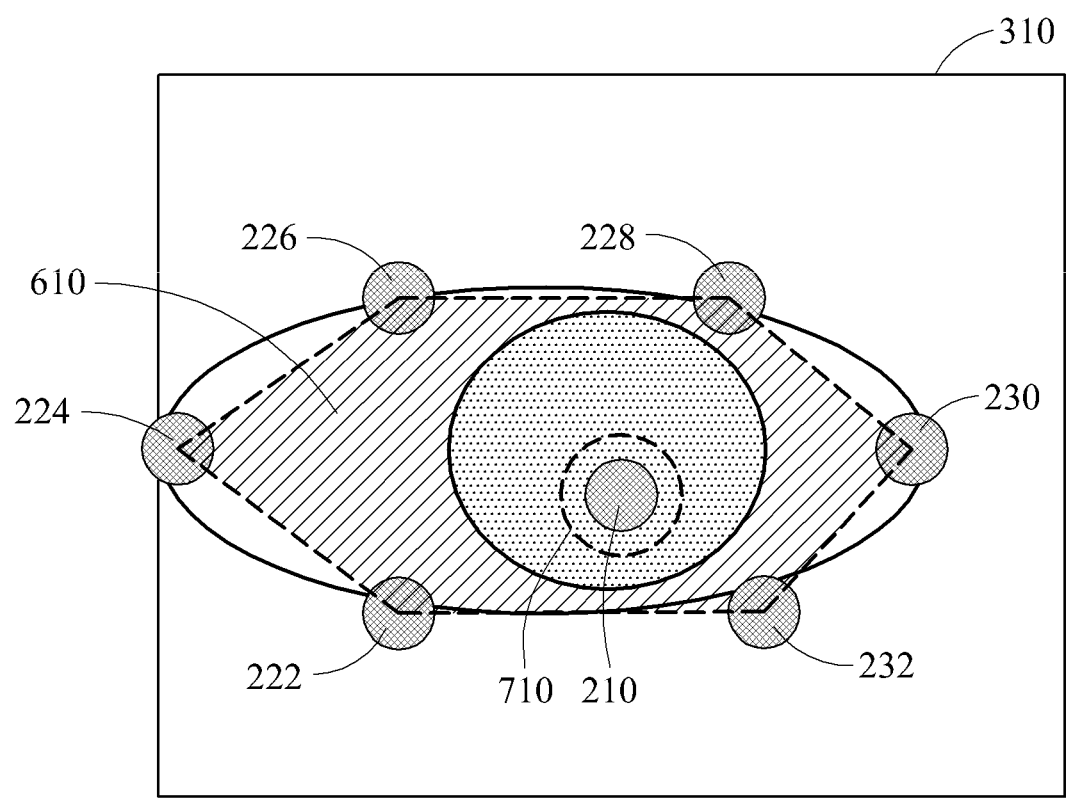

Referring to FIG. 7, the eye tracking apparatus may determine a pupil area in the inner eye area 610 based on pixel value information on pixels within the inner eye area 610. The eye tracking apparatus may calculate a first brightness average value corresponding to an average value of brightness values of pixels of the inner eye area 610, and calculate a second brightness average value corresponding to an average value of brightness values of pixels of an adjacent area 710 of the eye center feature point 210 among the pixels of the inner eye area 610.

For example, the eye tracking apparatus may determine that a predetermined and/or selected pixel is included in the pupil area when the predetermined and/or selected pixel included in the inner eye area 610 satisfies Equation 1.

brightness value of pixel<first brightness average value, and brightness value of pixel<second brightness value+ compensation value          [Equation 1]

As shown in Equation 1, a compensation value is a predetermined and/or selected value to adjust a condition of Equation 1 and has a value greater than or equal to "0".

In most cases, a first brightness average value with respect to the inner eye area 610 may be considered to be a threshold value, since a brightness value of the pupil area is less than a brightness value of an adjacent area of the pupil area. However, since a size of the pupil area is less than the adjacent area of the pupil area in the inner eye area 610, a pixel included in the adjacent area of the pupil area may be falsely determined as the pupil area when only the first brightness average value is considered. As shown in Equation 1, the eye tracking apparatus may more accurately determine the pupil area in the inner eye area 610 by considering the second brightness average value with respect to the adjacent area 710 of the eye center feature point 210 in addition to the first brightness average value.

The eye tracking apparatus may perform the aforementioned process with respect to all pixels included in the inner eye area 610 and store information, for example, a position value, on pixels determined as the pupil area.

Figure 8:
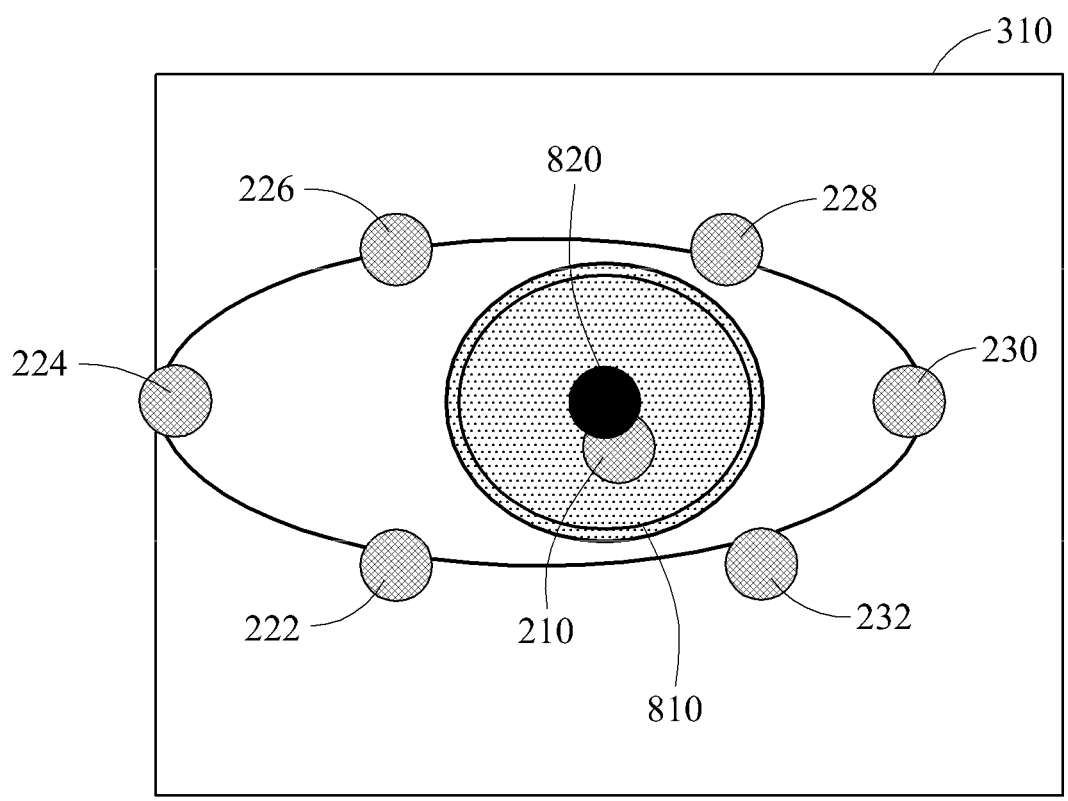

FIG. 8 illustrates a pupil area 810 determined based on the tracking process described with reference to FIG. 7. The eye tracking apparatus may determine an average value of position values of pixels included in the determined pupil area 810 as an eye position 820 of a user.

FIGS. 9 through 14 illustrate other examples in which an eye tracking apparatus tracks an eye position of a user in an image according to at least one example embodiment.

Figure 9:
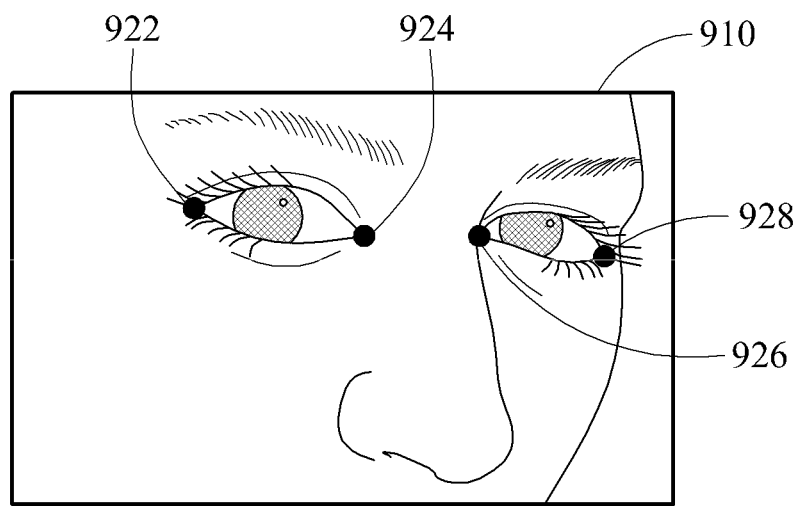
FIGS. 9 through 14 illustrate other examples in which an eye tracking apparatus tracks an eye position of a user in an image according to at least one example embodiment.

Referring to FIG. 9, the eye tracking apparatus may detect an eye and nose area 910 in an image and detect feature points 922, 924, 926, and 928 of an eye. In FIGS. 9 through 14, feature points are assumed to be detected in a contour of each eye as illustrated in FIG. 9. The eye tracking apparatus may detect a position of an eye of a user more quickly by using a small number of feature points.

Figure 10:
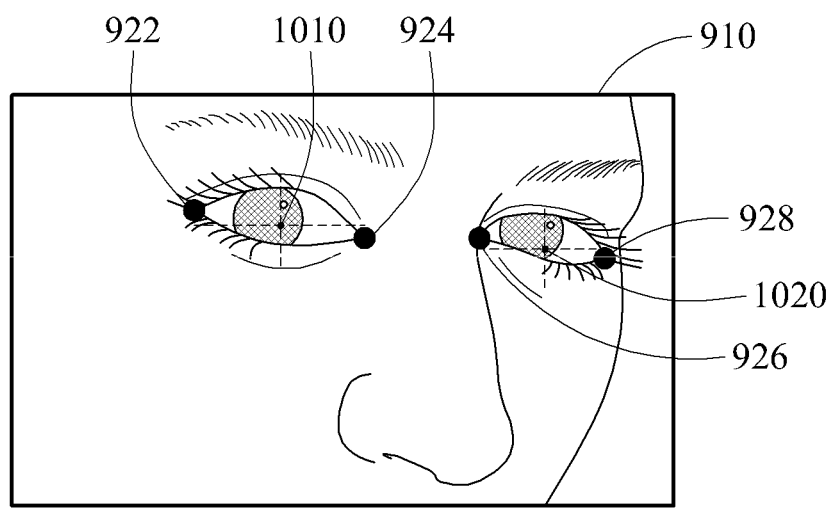

Referring to FIG. 10, the eye tracking apparatus may calculate a center among feature points based on a position relationship between two feature points detected in each eye. The eye tracking apparatus may calculate a center 1010 between the feature points 922 and 924 and calculate a center 1020 between the feature points 926 and 928.

Figure 11:
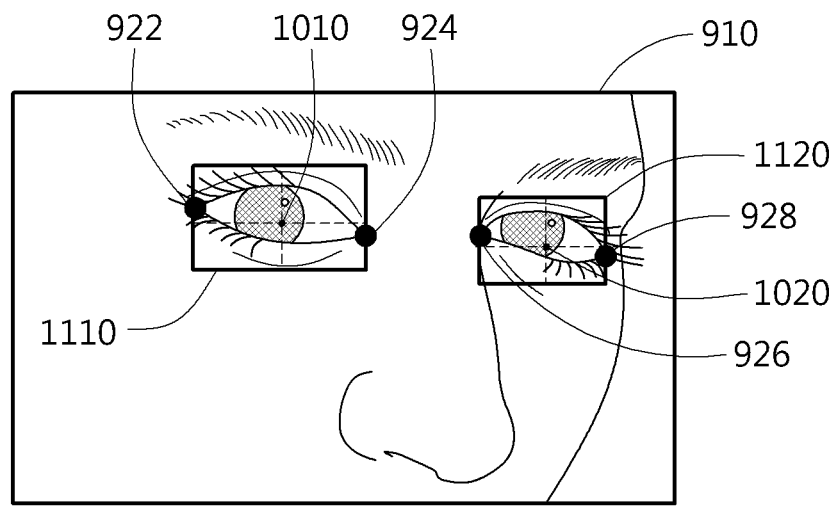

Referring to FIG. 11, the eye tracking apparatus may determine eye areas 1110 and 1120 based on the detected centers 1010 and 1020 and positions of the feature points 922, 924, 926, and 928. For example, the eye tracking apparatus may calculate a horizontal distance between the feature point 922 and the feature point 924, and determine a vertical distance by multiplying the calculated horizontal distance by a predetermined and/or selected rate, for example, "⅓". The eye tracking apparatus may determine, as the eye area 1110, an area based on the horizontal distance and the vertical distance from the center 1010. With respect to the center 1020 and the feature points 926 and 928, the eye tracking apparatus may determine the eye area 1120 based on the aforementioned process.

Figure 12:
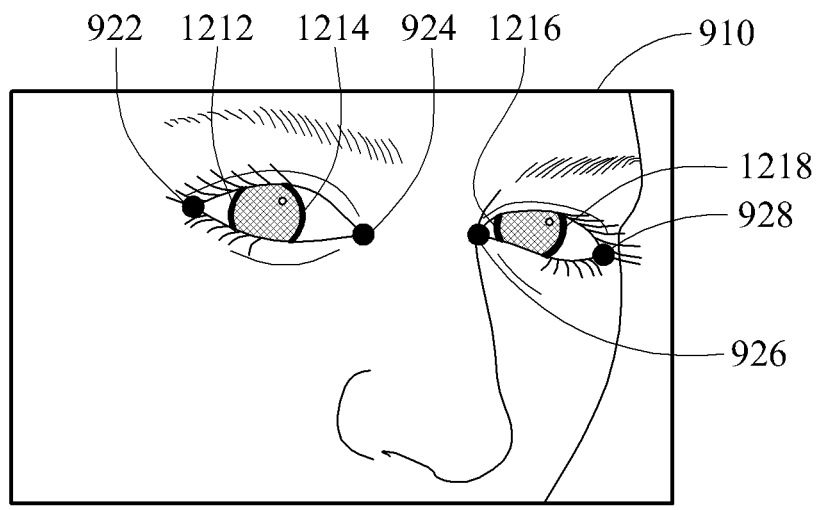

Referring to FIG. 12, the eye tracking apparatus may detect edge components 1212, 1214, 1216, and 1218 in a vertical direction in determined eye areas. For example, the eye tracking apparatus may detect the edge components 1212, 1214, 1216, and 1218 based on a Sobel edge extracting scheme, a Prewitt edge extracting scheme, a Roberts edge extracting scheme, and a Canny edge extracting scheme.

Figure 13:
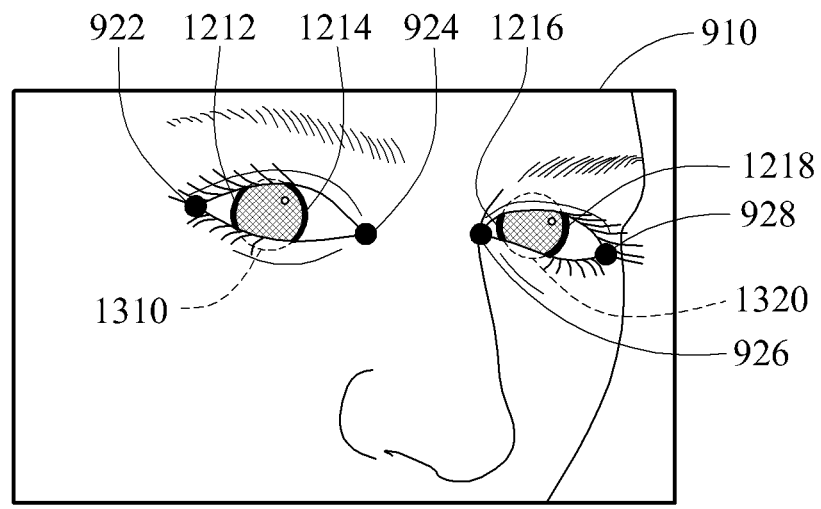
Figure 14:
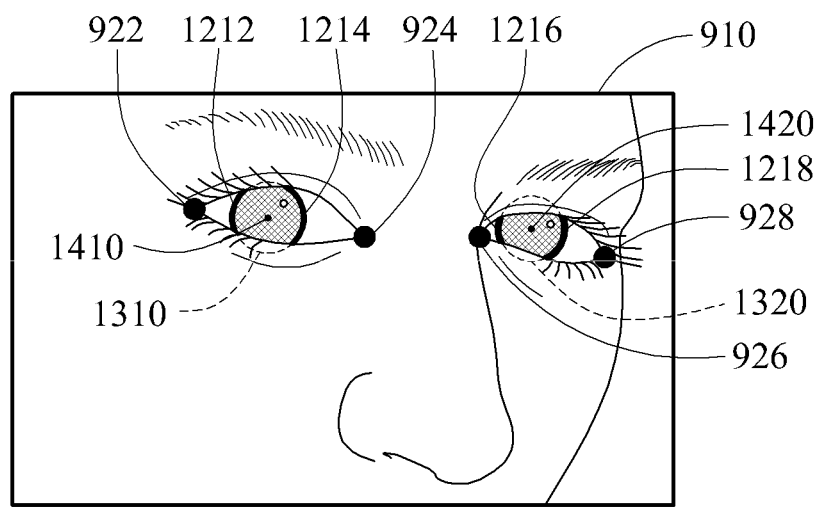

Referring to FIG. 13, the eye tracking apparatus may detect ellipses 1310 and 1320 associated with a pupil area in an eye area by fitting an ellipse based on the detected edge components 1212, 1214, 1216, and 1218. Referring to FIG. 14, the eye tracking apparatus may calculate a center of gravity of each of the detected ellipses 1310 and 1320 and determine the calculated centers of gravity as eye positions 1410 and 1420 of the user.

Figure 15A:
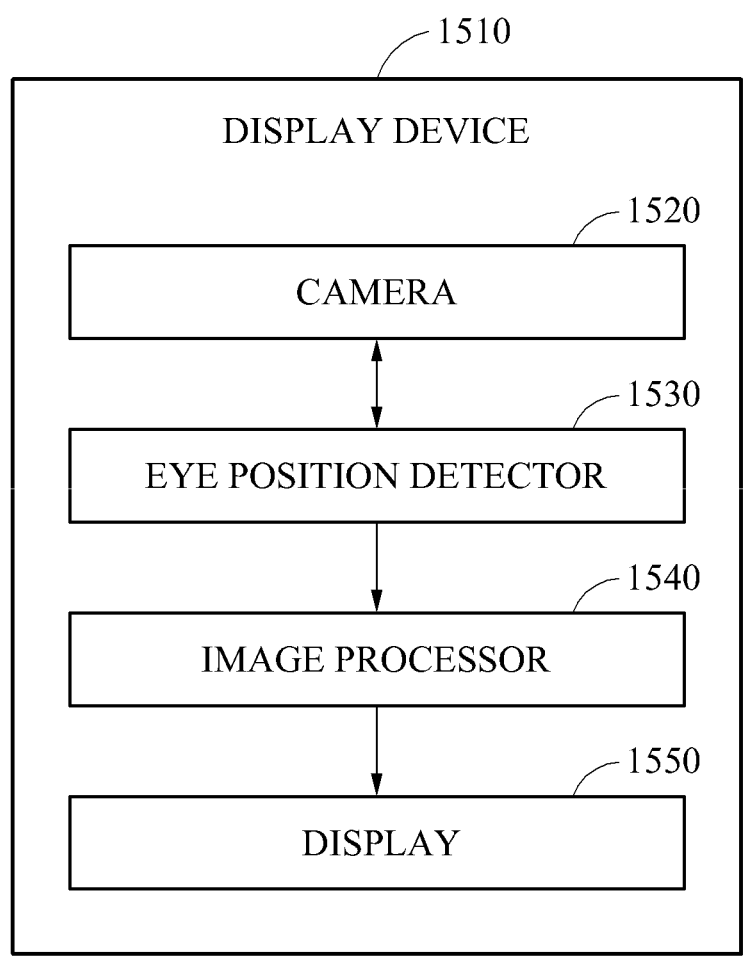
FIGS. 15A-15B illustrate an example of a display device according to at least one example embodiment.

FIG. 15A illustrates an example of a display device according to at least one example embodiment.

Referring to FIG. 15A, a display device 1510 may be, for example, a glassless display to output a 3D image without 3D glasses. The display device 1510 may track an eye position of a user and output a 3D image by reconstructing the 3D image based on the tracked eye position of the user. The display device 1510 includes a camera 1520, an eye position detector 1530, an image processor 1540, and a display 1550.

The camera 1520 may obtain a face image in which a face area of the user is present by photographing the user positioned in front of the display device 1510.

The eye position detector 1530 may detect the eye position of the user in the face image. The eye position detector 1530 may detect feature points of an eye in the face area or an eye and nose area in the face image, and detect the eye position of the user based on the detected feature points. The eye position detector 1530 may detect a position of an eye based on different methods according to a number of the detected feature points. For example, when a large number of eye contour feature points and an eye center feature point are detected in the face image, the eye position detector 1530 may detect the eye position of the user from the face image. The eye position detector 1530 may detect a position of an eye based on the processes described in FIGS. 1 through 14. In another example, the eye position detector 1530 may detect the eye position through a template matching in the eye and nose area and determine a center value of a template as a position of an eye center.

The eye position detector 1530 may convert eye position information of a 2D coordinate value determined based on the aforementioned process to a 3D coordinate value. In order to generate, by the display device 1510, a 3D image corresponding to positions of the left and right eye of the user in a 3D space, the positions of both eyes of the user are required to be converted from the 2D coordinate value to the 3D coordinate value. The eye position detector 1530 may convert the eye position information to the 3D coordinate value based on distance information on a distance between both eyes of the user and direction information on a face of the user. A predetermined and/or selected value, for example, 65 mm, may be used as the distance information on both eyes, however, the distance information is not limited thereto. The direction information on the face of the user may be obtained by matching the feature points detected from the face image and a 3D face model and calculating an angle at which the 3D face model rotates. In another example, the eye position detector 1530 may determine the 3D coordinate value of the eye position of the user based on a triangulation method using at least two cameras, for example, the camera 1520.

In an example, the eye position detector 1530 may convert the eye position information to the 3D coordinate value, correct the eye position information by estimating the eye position, and transfer the eye position information to the image processor 1540. A predetermined and/or selected amount of time may be required for generating the 3D image corresponding to the eye position of the user after the image processor 1540 receives the eye position information from the eye position detector 1530. When the user moves, the eye position information on the user may require corrections since a time delay occurs between a point of time at which the eye position of the user is detected and a point of time at which the image processor 1540 generates and outputs the 3D image. Thus, the eye position detector 1530 may estimate an eye position path of the user based on movement information of a user and the image processor 1540 may reconstruct the 3D image based on the estimated eye position path.

The image processor 1540 may reconstruct the 3D image, for example, a stereo image or 3D graphic data, based on the eye position of the user determined by the eye position detector 1530. The image processor 1540 may reconstruct the 3D image to be output through the display 1550 such that the 3D image reaches to the eye position of the user.

The display 1550 may display the 3D image processed by the image processor 1540. For example, display 1550 may display the 3D image using a lenticular lens, a parallax barrier, and a directional back light.

Figure 15B:
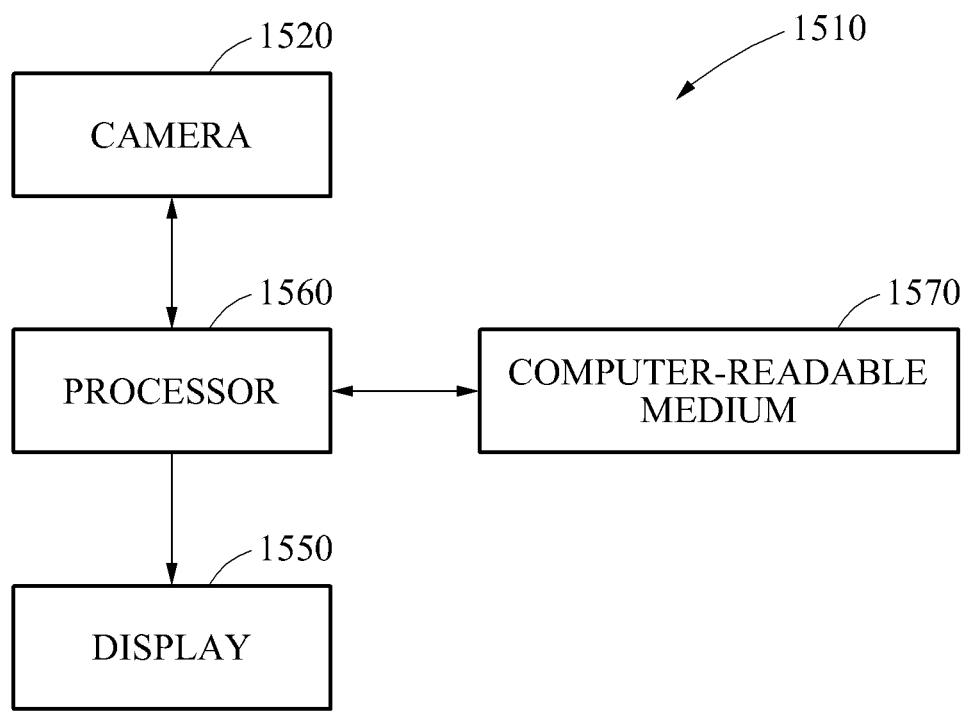

FIG. 15B illustrates a hardware block diagram of the display device 1510. FIG. 15B illustrates a processor 1560 configured to send and receive data/instructions to/from the camera 1520 and to/from a non-transitory computer-readable medium 1570.

The non-transitory computer-readable medium 1570 stores instructions for performing the functions described in FIGS. 1-14. More specifically, the processor 1560 may perform the functions of the eye tracking apparatus 100, the eye position detector 1530 and the image processor 1540 by executing the instructions stored in the non-transitory computer-readable medium 1570. Thus, by executing the instructions stored by the non-transitory computer-readable medium 1570, the processor 1560 becomes a special purpose computing device that performs eye tracking and eye position determination described above with reference to FIGS. 1 through 14. The processor 1560 may include one or more processing devices such as Central Processing Units (CPUs), digital signal processors (DSPs), application-specific-integrated-circuits, field programmable gate arrays (FPGAs) computers or the like.

The processor 1560 is also configured instruct the display 1550 to display the processed 3D image.

Figure 16:
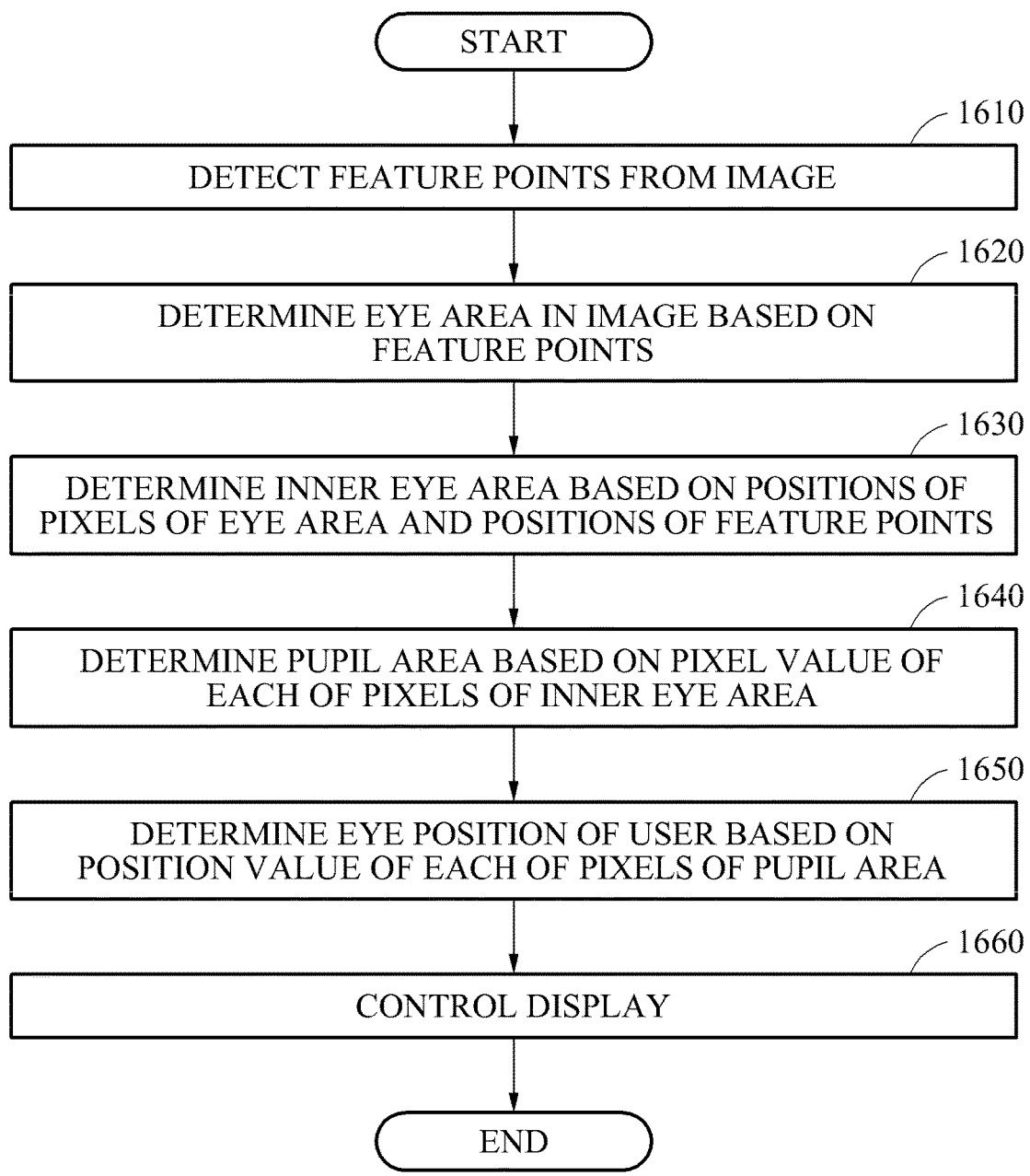
FIG. 16 is a flowchart illustrating an example of an eye tracking method according to at least one example embodiment.

FIG. 16 is a flowchart illustrating an example of an eye tracking method according to at least one example embodiment. The eye tracking method may be performed by the eye tracking apparatus 100, for example.

Referring to FIG. 16, in operation 1610, the eye tracking apparatus detects feature points from an image. For example, the eye tracking apparatus may detect an eye and nose area in an image in which a face of a user is photographed and detect an eye center feature point and at least one eye contour feature point in the eye and nose area.

In operation 1620, the eye tracking apparatus determines an eye area in an image based on the detected feature points. For example, the eye tracking apparatus may determine a maximum distance among distances between the eye center feature point and each of the eye contour feature points by calculating distances between the eye center feature point and each of the eye contour feature points, and determine the eye area based on the eye center feature point and the maximum distance.

In operation 1630, the eye tracking apparatus determines an inner eye area based on positions of pixels of the eye area and positions of the feature points. The eye tracking apparatus may calculate a first vector based on a position of a current (selected) pixel of the eye area and a position of an eye contour feature point and calculate a second vector based on the position of the eye contour feature point and a position of an adjacent eye contour feature point. The eye tracking apparatus may perform outer product calculation of a vector based on the first vector and the second vector. The eye tracking apparatus may identically calculate the first vector and the second vector with respect to other eye contour feature points. The eye tracking apparatus may determine that the current pixel is included in the inner eye area when outer product calculation results with respect to the eye contour feature points are indicated by a same sign, and determine that the current pixel is not included in the inner eye area when the outer product calculation results are indicated by different signs. The eye tracking apparatus may store information, for example, a brightness and a position, on pixels determined to be included in the inner area.

In operation 1640, the eye tracking apparatus determines a pupil area based on a pixel value of each the pixels of the inner eye area. The eye tracking apparatus may determine that the current pixel is included in the pupil area when a brightness value of the current pixel of the inner eye area is less than a first threshold value based on a first brightness average value and a second threshold value based on a second brightness average value. In such an example, the first brightness average value refers to an average value of brightness values of the pixels of the inner eye area and the second brightness average value refers to an average value of brightness values of adjacent pixels of the eye center feature point. The eye tracking apparatus may store information, for example, a position, on the pixels determined to be included in the pupil area.

In operation 1650, the eye tracking apparatus determines an eye position of the user based on a position value of each of the pixels of the pupil area. The eye tracking apparatus determines an average value of the position values of the pixels of the pupil area as the eye position of the user.

At operation 1660, the processor 1560 controls the display based on the determined eye position of the user.

The units and/or modules (e.g., the feature point detector 110, the eye area determiner 120, the inner eye area determiner 130, the pupil area determiner 140, the eye position determiner 150, the eye position detector 1530 and the image processor 1540) described herein may be implemented using hardware components and hardware components executing software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An eye tracking method, comprising:
   obtaining feature points corresponding to at least one portion of a face area of a user in an image,
   determining an inner area of an eye area of a first eye of the user based on the feature points;
   determining a pupil area of the user based on a pixel value of at least one pixel of the inner area; and
   determining an eye position of the user based on a position value of each pixel of the pupil area.

2. The method of claim 1, wherein the determining the inner area comprises determining the inner area of the eye area based on positions of pixels of the eye area and positions of the feature points of the eye area,
   wherein the inner area is within a boundary defined by the feature points.

3. The method of claim 1, wherein the determining the pupil area comprises,
   determining the pixels of the pupil area based on a first brightness average value of the pixels of the inner area and a second brightness average value of adjacent pixels to an eye center feature point of the image, the eye center feature point is a feature point of the feature points corresponding to a center of the first eye.

4. The method of claim 3, wherein the determining the pixels of the pupil area comprises,
   determining whether a brightness value of a selected pixel of the inner area is less than a first threshold value and less than a second threshold value, the first threshold value being based on the first brightness average value and the second threshold value being based on the second brightness average value.

5. The method of claim 1, wherein the determining the inner area comprises,
   calculating a first vector based on a selected pixel of the eye area and a first eye contour feature point of the feature points;
   calculating a second vector based on the first eye contour feature point and a second eye contour feature point of the feature points, the second eye contour feature point being adjacent to the first eye contour feature point, the first eye contour feature point and the second eye contour feature point corresponding to an eye contour of the eye area; and
   determining whether the selected pixel is in the inner area based on the first vector and the second vector.

6. The method of claim 5, wherein the determining whether the selected pixel is in the inner area comprises,
   determining that the selected pixel is in the inner area when vector calculation results of each of the first and second eye contour feature points are indicated by a same sign.

7. The method of claim 1, wherein the determining the eye position of the user comprises,
   determining an average value of the position values of the pixels of the pupil area as the eye position of the user.

8. The method of claim 1, wherein the determining the eye position of the user comprises,
   determining a maximum distance among distances between an eye center feature point of the feature points and each of eye contour feature points of the feature points, the eye center feature point corresponding to a center of the first eye of the user and the eye contour feature points corresponding to a contour of the first eye; and
   determining the eye area based on a position of the eye center feature point and the maximum distance.

9. The method of claim 1, wherein the determining the eye area comprises,
   detecting an eye center feature point of the feature points and at least one eye contour feature point of the feature points, the eye center feature point corresponding to a center of the first eye and the at least one eye contour feature point corresponding to a portion of a contour of the first eye; and
   determining the eye area based on the detected eye center feature point and the at least one eye contour feature point.

10. The method of claim 1, wherein the determining the eye position of the user comprises,
   determining two-dimensional (2D) eye position information of the first eye based on the position value of each pixel of the pupil area; and
   converting the 2D eye position information to a three-dimensional (3D) coordinate value based on distance information and direction information, the distance information associated with a distance between the first eye and a second eye of the user and the direction information associated with a direction of a face of the user.

11. The method of claim 10, wherein the converting the eye position information to the 3D coordinate value comprises,
   generating a personalized 3D face model by matching the feature points to a 3D face model; and
   estimating the direction information on the face of the user based on direction information on the personalized 3D face model.

12. The eye tracking method of claim 1, further comprising:
   controlling a glassless display based on the determined eye position of the user.

13. A non-transitory computer-readable storage medium storing a computer program, when executed by a computer, to cause the computer to perform the method of claim 1.

14. An eye tracking apparatus, comprising:
   a memory configured to store computer readable instructions; and
   a processor configured to execute the computer readable instructions such that the processor is configured to,
      obtain feature points corresponding to at least one portion of a face area of a user in an image,
      determine an inner area of an eye area of a first eye of the user based on the feature points,
      determine a pupil area of the user based on a pixel value of at least one pixel of the inner area, and
      determine an eye position of the user based on a position value of each pixel of the pupil area.

15. The apparatus of claim 14, wherein the processor is configured to determine the pixels of the inner area in response to a vector calculation based on a positional relationship between the feature points and pixels of the eye area.

16. The apparatus of claim 14, wherein the processor is configured to determine the pixels of the pupil area based on a brightness value of the pixels of the inner area, a first brightness average value of the pixels of the inner area and a second brightness average value of adjacent pixels of an eye center feature point of the feature points, the eye center feature point corresponds to a center of an eye of the user.

17. The apparatus of claim 14, wherein the processor is configured to,
   detect an eye center feature point of the feature points and at least one eye contour feature point of the feature points, the eye center feature point corresponding to a center of an eye of the user and the at least one eye contour feature point corresponds to a portion of a contour of the eye.

18. An eye tracking apparatus, comprising:
   a memory configured to store computer readable instructions; and
   a processor configured to execute the computer readable instructions such that the processor is configured to,
      determine an eye area of a user in an image based on feature points,
      detect an edge component in a vertical direction of the eye area and detect an ellipse component associated with a pupil area based on the detected edge component, and determine a center of an ellipse as an eye position of the user based on the ellipse component, wherein the processor is configured to obtain eye contour feature points of the feature points, determine a center of the eye contour feature points and determine the eye area based on the center of the eye contour feature points and a horizontal distance between eye contour feature points, the eye contour feature points corresponding to a contour of an eye of the user.

19. The apparatus of claim 18, wherein the processor is configured to determine a vertical distance based on the horizontal distance and determine the eye area based on the horizontal distance and the vertical distance relative to the center of the eye contour feature points.

* * * * *